United States Patent [19]
Fleming

[11] 3,754,536
[45] Aug. 28, 1973

[54] ROTARY COMBUSTION ENGINE
[75] Inventor: James D. Fleming, Warren, Mich.
[73] Assignee: General Motors Corporation, Detroit, Mich.
[22] Filed: May 4, 1972
[21] Appl. No.: 250,317

[52] U.S. Cl............................... 123/8.45, 123/8.01
[51] Int. Cl............................................ F02b 55/14
[58] Field of Search................ 123/8.13, 8.31, 8.27, 123/8.45; 418/61

[56] References Cited
UNITED STATES PATENTS
3,463,126   8/1969   Pax ..................................... 123/8.27

Primary Examiner—Carlton R. Croyle
Assistant Examiner—Michael Koczo, Jr.
Attorney—J. L. Carpenter and R. L. Phillips et al.

[57] ABSTRACT

A rotary combustion engine having an internal gas flow control providing gas flow from a trailing to a leading portion of each working chamber during the latter portion of a compression phase when communication between such portions becomes substantially limited between the stator housing's peripheral wall and the rotor face and the gas flow control in addition preventing back flow from a leading chamber to a trailing chamber.

3 Claims, 3 Drawing Figures

PATENTED AUG 28 1973 3,754,536
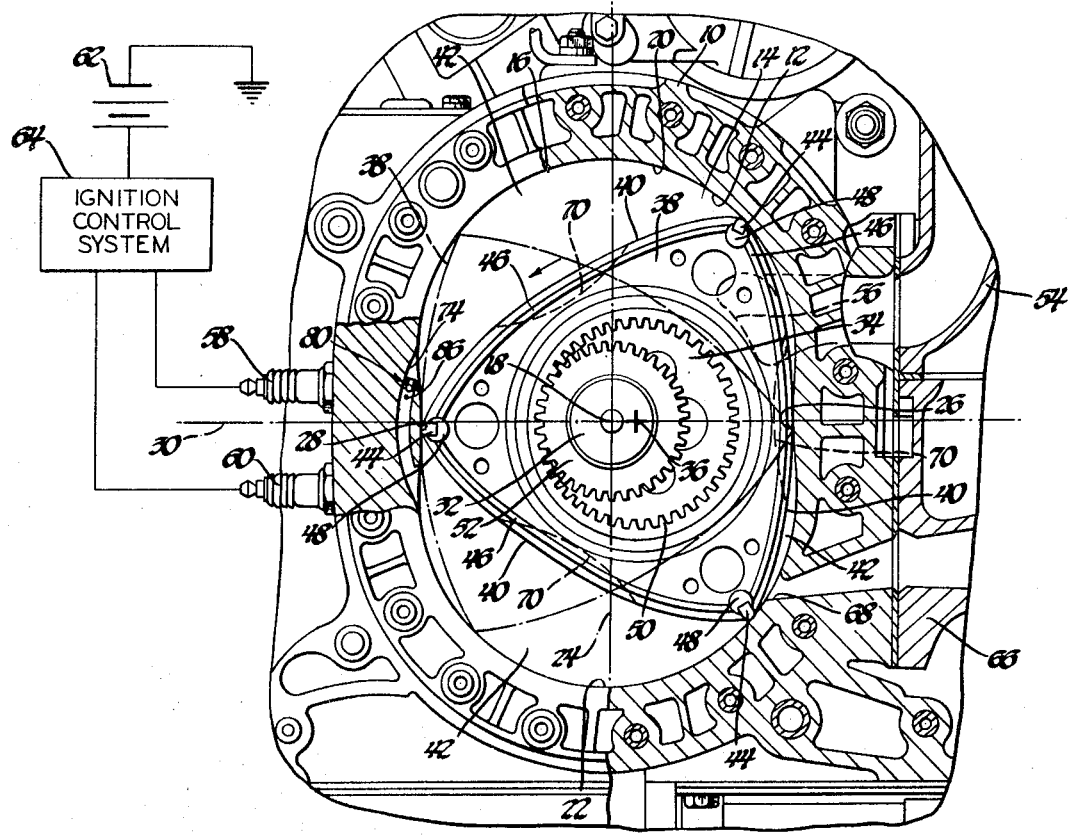
Fig.1
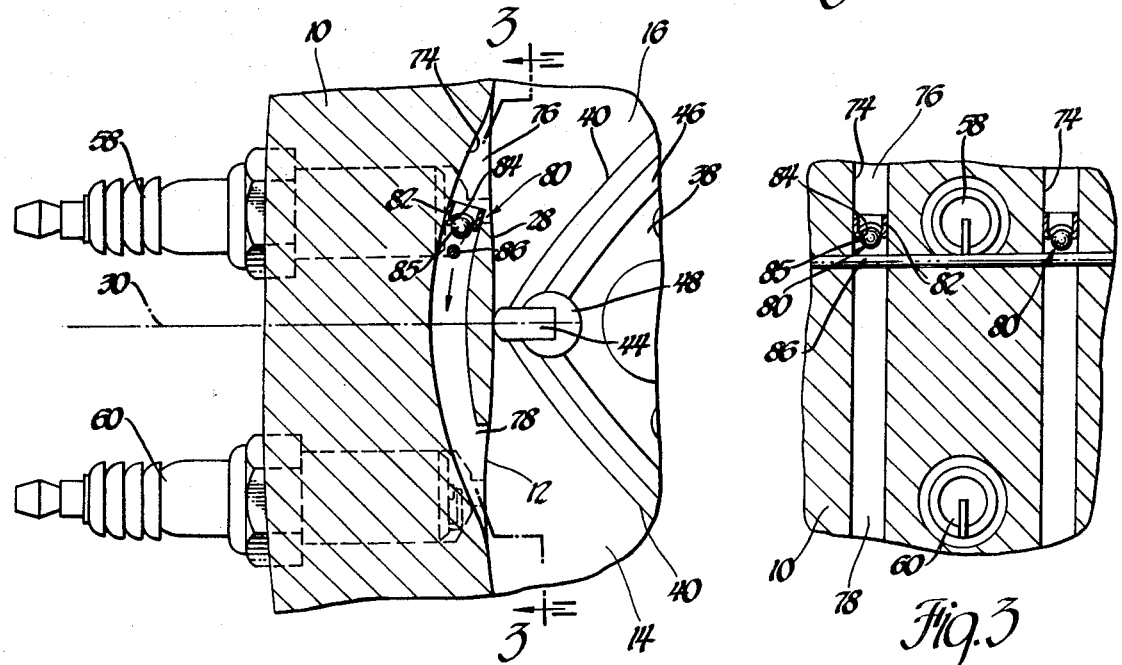
Fig.2
Fig.3

ROTARY COMBUSTION ENGINE

This invention relates to rotary combustion engines and more particularly to rotary combustion engines having internal gas flow control.

In rotary combustion engines of the Wankel type it is conventional practice to provide a recess in each rotor face which forms a substantial part of the combustion space in each working chamber and also serves as a flow path for gas flow from a trailing portion to a leading portion of each chamber when the communication between such chamber portions would be substantially limited by the clearance between the rotor face and the stator's peripheral wall during the final portion of compression. The gas flow requirements for removal of gas from the trailing portion to the leading portion restrict the shape and location of the combustion space in each rotor face with the result that the chamber may not be best shaped and located for the combustion process.

The rotary combustion engine according to the present invention has an internal gas flow control that permits a choice of shape and location of the combustion space in each rotor face apart from the gas flow requirements between the trailing and leading portion of each working chamber but does not provide a leakage path between any two working chambers. In one embodiment of the present invention this is provided by a gas flow passage in the engine housing having leading and trailing openings through the housing's internal peripheral wall of the rotor cavity for connecting the trailing portion to the leading portion of each working chamber during the final portion of compression. In addition there is provided a one-way valve in this gas flow passage that prevents connection between a leading chamber and a trailing chamber whenever the leading chamber has a higher pressure.

An object of the present invention is to provide a new and improved rotary combustion engine.

Another object is to provide in a rotary combustion engine an internal gas flow control that permits a choice of shape and location of a combustion space in each rotor face independent of the requirements for gas flow between a trailing portion and a leading portion of each working chamber during compression.

Another object is to provide in a rotary combustion engine a gas flow passage in the engine's housing that provides for gas flow from a trailing portion to a leading portion of each working chamber during compression and prevents connection between a leading chamber and a trailing chamber whenever the leading chamber has a higher pressure.

Another object is to provide a rotary combustion engine having an internal gas flow control that directs gas from a trailing portion of each working chamber through the engine's housing to a leading portion of this same chamber during compression and furthermore has a one-way valve that prevents flow from a leading chamber to a trailing chamber whenever the leading chamber has a higher pressure.

These and other object of the present invention will be more apparent from the following description and drawing in which:

FIG. 1 is a fragmentary transverse sectional view of a rotary combustion engine having an internal gas flow control according to the present invention.

FIG. 2 is an enlarged view of the internal gas flow control in FIG. 1.

FIG. 3 is a view taken on the line 3—3 in FIG. 2.

Referring to FIG. 1, the present invention is particularly suited for use in a Wankel type rotary combustion engine comprising a stationary housing 10 having an inwardly facing peripheral wall 12 and a pair of opposed end walls 14, of which only one is shown, cooperatively defining a cavity 16. The peripheral wall 12 is in the shape of a two-lobed epitrochoid or a curve parallel thereto whose center is indicated at 18 and comprises a pair of lobes 20 and 22 which are bisected by the curve's major axis 24 and a pair of cusps 26 and 28 which are bisected by the curve's minor axis 30 with the minor axis and the major axis intersecting at right angles at the center 18. A crankshaft 32 is rotatably mounted in the engine housing 10 so that its axis is conincident with the center 18 and has an eccentric 34 located in the rotor cavity 16 with its center line 36 offset from and parallel to the crankshaft axis.

A three-lobed rotor 38 having the general shape of a triangle with three arcuate faces 40 facing the peripheral wall 12 is mounted on the crankshaft eccentric 34 for rotation about the eccentric center line 36. The rotor faces 40 cooperate with the peripheral wall 12 and with the end walls 14 to define three variable volume working chambers 42 that are spaced about the rotor and move with the rotor within the engine housing. Chamber sealing is provided by an apex seal 44 mounted at each apex or corner of the rotor 38, a side seal 46 mounted on each rotor side extending adjacent each rotor face between each set of adjacent apex seals 44 and an intermediate corner seal 48 mounted on each rotor side at each rotor apex providing a sealing link between the adjacent ends of the two side seals and the apex seal at this rotor apex. The apex seals 44 are biased by biasing means, not shown, to continuously engage the peripheral wall 12 and both the side seals 46 and corner seals 48 are biased by biasing means, not shown, to engage the end walls with the complete sealing arrangement acting to seal the working chambers from each other. With the two-lobed peripheral wall 12 and the three apex rotor 38, there are provided the four phases of intake, compression, expansion and exhaust in each chamber in fixed relation to the housing when the rotor is forced to rotate at one-third the speed of the output shaft. This is accomplished by a timing gear train between the rotor 38 and the housing 10 which comprises an internally toothed ring gear 50 which is concentrically mounted on one side of the rotor 38. Ring gear 50 meshes with an externally toothed ring gear 52 which is concentric with and freely received about the crankshaft 32 and is fixed by securing means, not shown, to the housing 10. The ring gear 50 has 1 and ½ times the number of teeth as the gear 52 to provide the required ratio of 3:1 between the crankshaft and rotor.

The engine further has an induction system comprising an intake manifold 54 that is secured to the engine housing 10 and receives an air-fuel mixture from a conventional carburetion system, not shown, and delivers this air-fuel mixture to an intake port 56 which opens to the rotor cavity 16 through one of the end walls 14 at a location on one side of cusp 26 to one side of and near the minor axis 30 and to one side of the major axis 24. It will also be understood that there may be another intake port identical to and opposite the intake port 56 in the opposite end wall. With this arrangement, air-fuel mixture is periodically admitted to each working chamber 42 by one side of the rotor uncovering the intake port to each working chamber while it is expanding during its intake phase. Combustion is initiated by a pair of sprak plugs 58 and 60 which are mounted in the engine housing 10 so that their electrodes are open to the rotor cavity on opposite sides of the other cusp 28. With rotor rotation in the direction indicated by the arrow in FIG. 1, the spark plug 58 is commonly referred to as the trailing plug and the other spark plug 60 is commonly referred to as the leading spark plug. Voltage is applied to the spark plugs 58 and 60 from a D.C. supply 62 by an ignition control system 64 which may be of any suitable type that operates to supply voltage simultaneously to both plugs and also to only one or the other of the plugs during certain operating conditions as is well known in the art, the timing being such that sparking occurs each time the rotor 38 is in the vicinity of one of its three top-dead-center positions as shown in dashed line in FIG. 1 with the associated working chamber having undergone its compression phase. After the working chamber has undergone its expansion phase on the occurrence of combustion and with continued rotor rotation, the products of combustion are exhausted by an exhaust manifold 66 that is secured to the housing 10 and has an exhaust port 68 open to the rotor cavity 16 through the peripheral wall 12 at a location on the side of cusp 26 opposite where the intake port 56 is located, i.e., the exhaust port 68 is located on the same side of the major axis 24 as the intake port 56 but on the opposite side of and near the minor axis 30. In this exhaust port position, the rotor apexes thus periodically open the chambers that trail them to the exhaust passage during the exhaust phase while the chambers are undergoing contraction.

In engines of this type there is generally provided a cavity or recess 70 in each rotor face 40 that forms part of the working chamber. The compression ratio may be varied by varying the size of the recess 70 and furthermore, its location and shape may be varied to control the combustion process as is well known in the art. However, apart from affecting the compression ratio and the combustion process, this recess is normally located centrally of the rotor face and elongated in a direction transverse to the rotor axis since it is required to maintain connection between the leading and trailing portions or regions of the working chamber when such communication becomes restricted by the cusp 28 during the compression phase as the rotor face of the chamber approaches top-dead-center position. As a result, the shape and location of the recesses 70 on the rotor faces 40 have been restricted by the necessity of having to remove the gases from the so-called "squish area" between the trailing portion of the chamber and the peripheral wall as the cusp 28 is approached and the clearance between the rotor face and the peripheral wall closes.

The gas flow control according to the present invention incorporated in the above disclosed engine comprises one-way gas passage means in the rotor housing 10 that has openings to the rotor cavity for effecting gas flow from the trailing portion to the leading portion of each working chamber in the vicinity of the chamber's top-dead-center rotor position and prevents back-flow from a leading chamber to a trailing chamber when an apex seal traverses the area between these passage openings to the rotor cavity. The gas passage means comprises a pair of gas passages 74 that follow an arcuate path across the minor axis 30 past the cusp 28 as viewed in FIG. 2 and are axially spaced on opposite sides of the spark plugs 58 and 60 as viewed in FIG. 3. Each of the gas passages 74 as shown in FIG. 2 has an inlet 76 that is open to the rotor cavity 16 through the peripheral wall 12 on the trailing spark plug side of the cusp 28 and minor axis 30 and an outlet 78 that is open to the rotor cavity 16 through the peripheral wall 12 on the leading spark plug side of the cusp 28 and the minor axis 30, both the inlet 76 and the outlet 78 of the gas passage 74 being spaced along the peripheral wall 12 a distance substantially less than that spanned by a rotor face when in the vicinity of top-dead-center. In addition, there is provided in each gas flow passage 74 a check valve 80 that permits flow in the direction from the inlet 76 toward the outlet 78 and prevents flow in the opposite direction. Each check valve 80 comprises, as shown in FIGS. 2 and 3, a valve seat member 82 tht is press fitted in the passage 74 and has a central valve opening 84 which is closable by a ball valve 85 engageable with the valve seat 82. When the pressure at inlet 76 is higher than that at outlet 78, the gas pressure differential moves ball valve 85 to an open valve position against a limit stop provided by a single pin 86 extending transverse through both of the gas passages axially of the engine housing. Alternatively, when the pressure at the outlet 78 is higher than that at the inlet 76, the gas pressure differential moves ball valve 85 against seat 82 to close valve opening 84 to prevent reverse gas flow.

On operation of the rotary combustion engine with the gas flow control according to the present invention during the compression phase when the rotor 38 is approaching one of its top-dead-center positions with one of the working chambers then being divided by the cusp 28 and this chamber's rotor face into a trailing portion and a leading portion, the leading portion will be increasing in volume on continuing rotor motion while the trailing portion is reducing in volume. When the gas pressure in the trailing portion exceeds the gas pressure in the leading portion the valves 80 are opened by this gas pressure differential and gas in the contracting trailing portion is then forced in the direction indicated by the arrow through the gas flow passages 74 into the expanding leading portion of this working chamber. This gas flow in the direction of rotor rotation through the gas flow passages 74 continues so long as the gas pressure differential between inlet and outlet forces such flow. Then when the trailing apex seal of this working chamber has traversed the inlet 76 of the gas flow passages 74 as shown by the full line rotor position in FIG. 1, backflow from the then leading chamber to the then trailing chamber forced by the pressure in the leading chamber being higher than that in the trailing chamber is prevented since this pressure differential forces the valves 80 to close. Then on continued rotor rotation this trailing apex seal will eventually traverse the outlet 78 of the gas flow passages 78 at which time both the inlet and outlet of the gas flow passages are open to the next working chamber to repeat the gas flow control cycle. It will also be appreciated that more or less gas passages may be used to provide a flow area meeting the gas flow requirement. Since the gas flow control of the present invention provides for removing gases from the squish area between the rotor faces and housing, there is no restriction in that regard as to the shape and location of the combustion spaces in the rotor faces best suited for the combustion process.

The above described embodiment is illustrative of the invention which may be modified within the scope of the appended claims.

I claim:

1. A rotary combustion engine comprising a housing having opposing end walls and a multilobed peripheral wall defining a cavity, a crankshaft rotatably supported in said housing having an eccentric located in said cavity, a multiface rotor rotatably mounted on said eccentric and cooperating with said walls to provide a plurality of chambers that are spaced about and move with said rotor while varying in volume as said rotor and said crankshaft rotate with each of said chambers during one rotor revolution sequentially undergoing expansion and compression phases at least twice, an intake port open to said cavity at a location to be periodically connected to each of said chambers during a first expansion phase, each said chamber being separated into a leading portion and a trailing portion by a cusp portion of said peripheral wall after a first compression phase following said first expansion phase, ignition means for periodically effecting a spark in each of said chambers after said first compression phase, an exhaust port open to said cavity at a location to be periodically connected to each of said chambers during a second compression phase following a second expansion phase, and passage means including one-way valve means having an inlet and an outlet opening to said cavity for connecting the trailing portion to the leading portion of each said chamber during the final portion of said first compression phase and preventing connection between a leading chamber and a trailing chamber.

2. A rotary combustion engine comprising a housing having a pair of opposed end walls and a peripheral wall defining a cavity, said peripheral wall having basically the profile of an epitrochoid with two lobes and two cusps, a crankshaft rotatably supported in said housing having an eccentric located in said cavity, a rotor rotatably mounted on said eccentric having basically the profile of a triangle having three peripheral faces facing said peripheral wall, gear means between said rotor and said housing for providing a fixed speed ratio between said rotor and said crankshaft whereby said crankshaft is caused to rotate three revolutions for every rotor revolution, said rotor faces and said housing walls cooperatively providing three working chambers that are spaced about and move with said rotor while varying between a minimum volume at said cusps and a maximum volume intermediate said cusps as said rotor and said crankshaft rotate and wherein each said chamber when at minimum volume is divided by the then-associated cusp into a leading portion and a trailing portion, an intake port open to said cavity at a location to one side of one of said cusps so as to be periodically connected to each of said working chambers, an exhaust port open to said cavity at a location on the other side of said one cusp so as to be periodically connected to each of said chambers, ignition means for periodically effecting a spark in each of said chambers when adjacent the other cusp, and passage means including one-way valve means in said housing for permitting gas flow from said trailing portion to said leading portion of each of said chambers past said other cusp and preventing gas flow from a leading chamber to a trailing chamber.

3. A rotary combustion engine comprising a housing having opposed end walls and a peripheral wall defining a cavity, said peripheral wall having basically the profile of an epitrochoid with two lobes and two cusps, a crankshaft rotatably supported in said housing having an eccentric located in said cavity, a rotor having basically the profile of a triangle with three apexes and three peripheral faces facing said peripheral wall rotatably mounted on said eccentric, means for providing a fixed speed ratio between said rotor and said crankshaft so that said crankshaft is caused to rotate as said rotor planetates with a fixed cyclic relationship of three crankshaft revolutions for every rotor revolution, said rotor faces and said housing walls cooperatively providing three chambers that are spaced about and move with said rotor while varying in volume as said rotor and said crankshaft rotate and reaching a minimum volume when the associated rotor face is exactly opposite one of the cusps which then divides the chamber into a trailing portion and a leading portion and reaching a maximum volume intermediate the cusps, an intake port open to said cavity at a location on one side of one of said cusps so as to be connected to deliver a gas to said chambers, a spark plug mounted in said housing having an electrode open to said cavity at a location adjacent the other cusp so as to be periodically exposed to said chambers when they span said other cusp, a passage in said housing having an inlet open at one end to said cavity at a location on one side of said other cusp and an outlet open at the other end to said cavity at a location on the other side of said other cusp to provide for connection between the trailing and leading portions of said chambers when they span said other cusp, a one-way valve in said passage for permitting gas flow from the trailing portion to the leading portion of said chambers when they span said other cusp and preventing gas flow from a leading chamber to a trailing chamber when a rotor apex is intermediate said inlet and said outlet, and an exhaust port open to said cavity at a location on the other side of said one cusp so as to be periodically connected to exhaust said chambers.

* * * * *